W. GATES.
Grain Rake.
No. 3,386.
Patented Dec. 20, 1843.
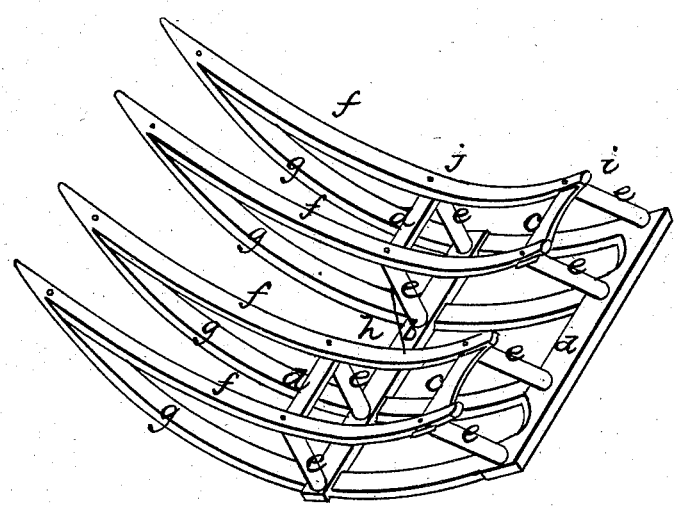

UNITED STATES PATENT OFFICE.

WM. GATES, OF BARRE CENTRE, NEW YORK.

IMPROVEMENT IN GRAIN-RAKES.

Specification forming part of Letters Patent No. 3,386, dated December 20, 1843.

*To all whom it may concern:*

Be it known that I, WILLIAM GATES, of the town of Barre, county of Orleans, and State of New York, have invented a new and useful machine for taking up grain after the cradler, called the "Genesee Circular Grain-Rake; and I do hereby declare that the following is a full, clear, and exact description of the construction and operation of the same, reference being had to the annexed drawings, making a part of this specification, in which—

A is the head-piece, two feet four inches long, two and a half inches wide, five-eighths thick, hollowed out on inside at ends, forming handles, as shown in the accompanying drawings.

B is a slat, same length and thickness, one inch wide.

C C are ties, nine inches long, seven-eighths wide, three-eighths thick, on posts above head-piece.

D D are ties above slat, same as above head-piece.

E E E E E E E are posts or standards, eight inches long, proper size for such work, with three-eighths tenons on each end, sufficient length to receive the upper and lower work, as shown in the drawings.

$ffff$ are raves or risers, extending from $i$ to point, seven-eighths inch wide, three-eighths thick. From $i$ to J is the segment of a circle whose radius is one and a half foot from J to point, a little curving, as shown in the drawings.

G G G G are runners, from four feet eight inches to five feet long, one inch wide, five-eighths thick, and are the segment of a circle whose radius is two feet three inches.

H are small braces from slat to posts, as shown in the drawings. Halve the head-piece and runners together, leaving the two spaces at the handles seven inches wide, the middle space nine inches.

Halve the slat on runners one-third way from head to point, set in the posts, put on the ties and raves; match raves on the curve of runners at the point, rivet them together; brace from slat to posts, keeping the upper part of the middle space clear for binding; bring the runners to a point by the curve of rave; take off the sides to make rounding points, suitable to run in the stubble easy; shoe the forward part of runners with hoop-iron or other suitable material; let it come over the point and fasten to the rave to strengthen the joint. The runners and raves, put together as shown in the accompanying drawings, may be called "teeth."

On smooth land wheels may be attached to the machine by setting posts between the runners and raves of the outside teeth half-way from slat to point. Let the wheels run on pivots in the posts. Set them below the runners, so as to balance the points of the teeth to the ground. The wheels must be small enough to run below the raves.

If necessary, a steel edge may be attached to the left-hand rave to cut its way where the grain is not all cut off by the cradler in pointing out.

The machine may be made of any suitable material and varied to the places used. Where grain grows tall and heavy they will want to be wider and higher than where it grows short and thin.

*The manner of using.*—Take it by the handles; shove the points under the grain till you get sufficient on the machine for a bundle; press down and let go the handles; set your foot on the head-piece, which will rock the machine up, sliding the grain into the bosom formed by the circle of the raves; bind on the machine in the space left clear for that purpose; throw off the bundle and the machine will rock up so the handles can be taken with ease.

What I claim as my invention is—

The above-described method of constructing a grain-rake—that is to say, the manner in which I have combined and arranged the raves and runners and the manner in which I have combined with the raves and runners the posts or standards and connecting-pieces, so as to leave an open space in the middle of the rake to admit of binding the straw, as set forth in the above specification.

WILLIAM GATES.

Witnesses:
 NATHAN ANDREWS,
 J. D. BUCKLAND.